United States Patent [19]
Badertscher et al.

[11] Patent Number: 5,395,569
[45] Date of Patent: Mar. 7, 1995

[54] TUBULAR T-SHAPED NOZZLE ASSEMBLY FOR TREATING FLUIDS

[75] Inventors: Ernest Badertscher, Orbe; Paul-Henri Poget, Bretonnieres, both of Switzerland

[73] Assignee: Nestec S.A., Vevey, Switzerland

[21] Appl. No.: 148,583

[22] Filed: Nov. 8, 1993

[30] Foreign Application Priority Data

Dec. 9, 1992 [CH] Switzerland .................. 03 769/92-1

[51] Int. Cl.$^6$ ............................................. B01F 3/04
[52] U.S. Cl. ........................................ 261/62; 261/76; 261/DIG. 76; 261/DIG. 78
[58] Field of Search ........ 261/76, DIG. 76, DIG. 78, 261/DIG. 13, 62

[56] References Cited

U.S. PATENT DOCUMENTS

| | | |
|---|---|---|
| 2,127,026 | 8/1938 | Grindrod . |
| 2,328,414 | 8/1943 | Beyer .......................... 261/DIG. 13 |
| 2,530,638 | 11/1950 | White ..................... 261/76 |
| 2,778,800 | 1/1957 | Sheahan ................... 261/76 |
| 2,794,447 | 6/1957 | Spitz ..................... 261/DIG. 76 |
| 2,976,024 | 3/1961 | Martinek . |
| 3,219,325 | 11/1965 | Brown .......................... 261/DIG. 13 |
| 3,219,483 | 11/1965 | Goos et al. ................ 261/76 |
| 3,331,590 | 7/1967 | Battenfeld et al. ......... 261/DIG. 13 |
| 3,409,274 | 11/1968 | Lawton ................... 261/76 |
| 3,427,954 | 2/1969 | Long ..................... 261/76 |
| 3,450,022 | 6/1969 | Engel . |
| 4,160,002 | 7/1979 | Janovtchik ............. 261/76 |
| 5,061,406 | 11/1991 | Cheng ................... 261/76 |

FOREIGN PATENT DOCUMENTS

| | | |
|---|---|---|
| 369967 | 5/1967 | Belgium . |
| 271432 | of 1912 | Germany . |
| 898586 | 7/1949 | Germany . |
| 2036534A | 7/1980 | United Kingdom . |
| 1065030 | 1/1984 | U.S.S.R. . |

OTHER PUBLICATIONS

Derwent Abstract No. 84-212440/34 of Soviet Patent Document No. SU 1065030 A (1984).

*Primary Examiner*—Tim Miles
*Attorney, Agent, or Firm*—Vogt & O'Donnell

[57] ABSTRACT

An apparatus for treating fluid products has a T-shaped tubular body which provides a longitudinal passage and an intersecting passage which intersects the longitudinal passage at a tubular body junction thereby defining and separating the longitudinal passage into first and second passage portions. The first passage portion, at a position adjacent the junction, is beveled to provide a valve seat, and a first nozzle member is mounted for reciprocative longitudinal displacement in the first passage portion and has a beveled end valve member portion for, upon displacement towards the junction, fluid-tight contact against the valve seat. A bore through the first nozzle member provides for fluid communication in the first passage portion from the bore to between the valve member portion and the valve seat when the valve member portion is displaced away from the seat. A second nozzle member is positioned and extends longitudinally in the second passage portion and also is mounted for reciprocative longitudinal displacement. The second nozzle member has a longitudinally extending bore terminating in an outwardly beveled portion which provides a valve seat for fluid-tight contact with the first nozzle valve member portion upon positioning of the first nozzle valve member portion and second nozzle member valve seat against one another.

7 Claims, 1 Drawing Sheet

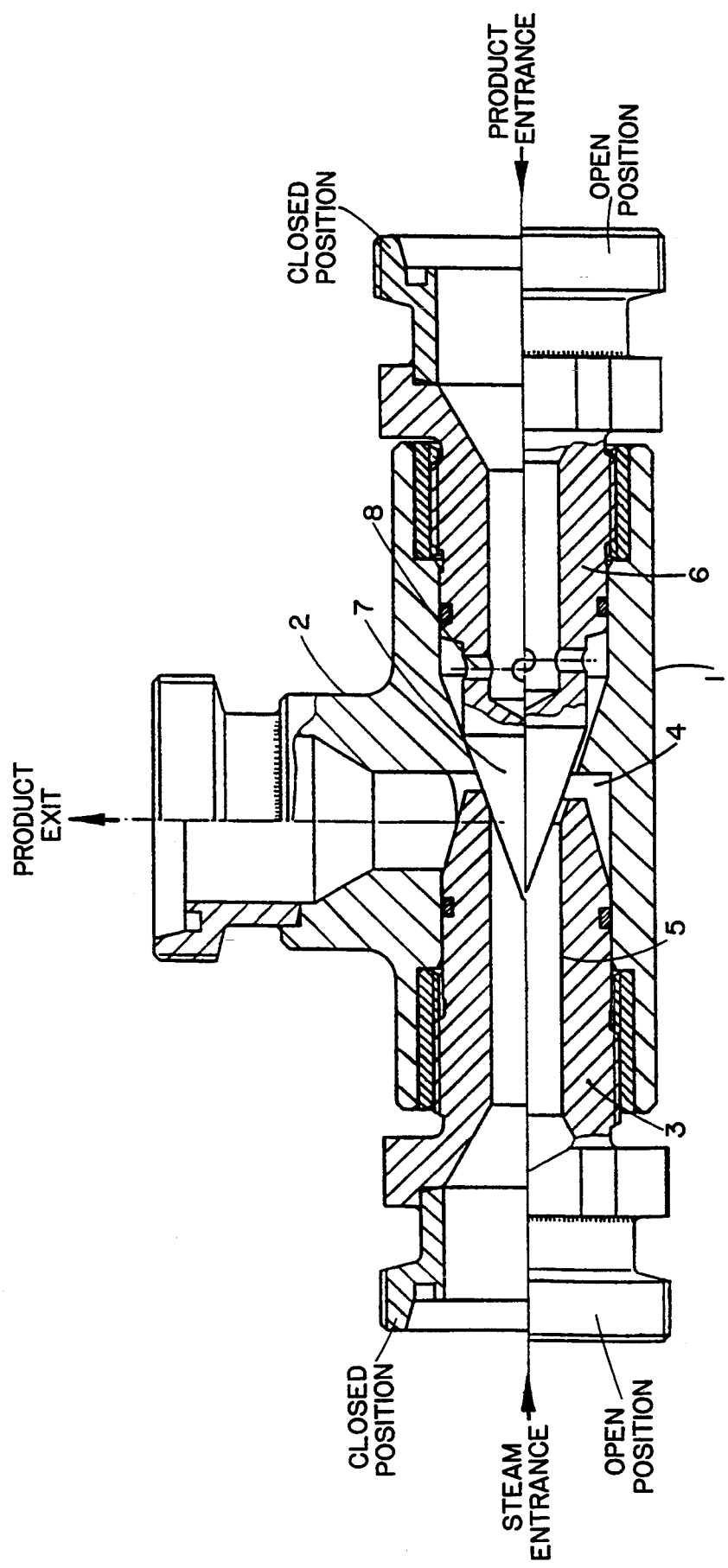

TUBULAR T-SHAPED NOZZLE ASSEMBLY FOR TREATING FLUIDS

BACKGROUND OF THE INVENTION

This invention relates to an arrangement for treating a food product by injection of steam and to a process for treating the food product with this arrangement.

Swiss Patent CH 626 788, for example, describes an arrangement for sterilizing and/or homogenizing a fluid product by injection of steam comprising a T-shaped tubular body, which consists of a straight tube and a tubular arm for introduction of the fluid product, and a steam injection nozzle arranged axially in a first end of the tube and opening into a mixing chamber at the junction between the arm and the tube. In this known arrangement, the inner wall of the nozzle converges downstream with a short bore of constant cross-section which opens into the mixing chamber, a mixing screen being disposed in the tube at a distance from the exit of the nozzle bore. The particular feature of this known arrangement is that it enables the product for sterilization to be rolled into a thin layer before it is contacted in countercurrent with the jet of steam. The rolling effect is obtained by the fixing of a cone to the nozzle from which the steam jet issues. A homogenizing effect is then obtained by the shearing of the product which enters the sonic jet of steam in countercurrent.

In the context of Swiss Patent CH 626 788 and throughout the remainder of the present specification, the sonic velocity of a gas through a nozzle is understood to be the velocity reached when the value of the pressure upstream of the nozzle is at least twice the value of the pressure downstream. However, this known arrangement, which provides for very effective temperature control up to the limit of the available pressures of the steam network, does have one disadvantage. Thus, when it is desired, for example, to change the throughput of steam introduced into the arrangement, the injection nozzle has to be replaced by a nozzle having a diameter adapted to the desired throughput. To do this, the process has to be interrupted so that the installation can be modified.

SUMMARY OF THE INVENTION

The problem addressed by the present invention was to provide an arrangement for treating INTER ALIA a fluid food product by injection of steam which would enable the throughput of steam introduced into the arrangement to be varied without the installation having to be modified by changing the nozzle and hence without the process having to be interrupted.

Accordingly, the present invention provides an arrangement for treating a food product by injection of steam, comprising:

a T-shaped tubular body consisting of a straight tube and a tubular outlet arm for the treated product, a steam injection nozzle disposed axially in a first end of the tube, the inner wall of the downstream end of the nozzle diverging downstream from a short bore of constant cross-section, an injection nozzle for the product to be treated disposed axially in the second end of the tube, the downstream end of the nozzle converging downstream and advancing into the divergent downstream end of the steam injection nozzle, the inner wall of the straight tube comprising at the downstream end of the product injection nozzle a conically shaped constriction which converges downstream of the nozzle, at least one orifice formed transversely in part of the downstream end of the product injection nozzle, the orifice opening into the interior of the straight tube, and the steam and product injection nozzles being mounted for axial displacement inside the straight tube.

The present invention also provides a process for treating a food product in which the steam and the product to be treated are each guided in countercurrent to the other from one end of a straight tube, the steam having a sonic velocity, the steam and the product are mixed in a mixing chamber and the treated product is removed through a tubular arm, the tubular arm and the straight tube forming a T-shaped tubular body.

The arrangement and the process according to the invention may be used for the sterilization and/or homogenization of a fluid product by injection of steam.

DETAILED DESCRIPTION OF THE INVENTION

In the context of the invention, a fluid product is understood to be a solution or suspension (for example aqueous) having a viscosity of the order of 1 to 100,000 mPa's It is possible with the arrangement according to the invention to inject only that quantity of steam which is required to bring the fluid product to the desired temperature by condensation on the product of all the steam injected. The heated fluid is thus highly homogeneous on leaving the arrangement without any risk of possible variations in pressure during its passage into a downstream holding tube resulting in variations in the temperature of the injected steam. This provides for optimal utilization of the steam and for remarkably stable sterilization and/or homogenization conditions for the fluid. In the particular case of milk-containing products, a good homogenizing effect is obtained by the arrangement through shearing of the fatty globules. The invention also enables a stable effect to be obtained for viscous products, more particularly for such products as cereal-based porridge-like foods.

Other features and advantages will become apparent from the following description in conjuction with the accompanying drawing which is provided purely by way of example.

BRIEF DESCRIPTION OF THE DRAWING

The sole FIGURE diagrammatically illustrates the arrangement according to the invention.

DETAILED DESCRIPTION OF THE DRAWING

Hereinafter, the ends of the nozzles are defined in relation to the direction of flow inside the nozzles. Thus, the upstream end of a nozzle is understood to be the end furthest from the mixing chamber. The downstream end is understood to be the part nearest the centre of the arrangement, i.e., nearest the mixing chamber.

The arrangement illustrated in the drawing comprises a T-shaped tubular body consisting of a straight tube (1) and a tubular outlet arm (2) for the treated product, the straight tube (1) thereby providing a longitudinal passage and the tubular outlet arm (2) providing an intersecting passage which intersects the longitudinal passage at the junction of the straight tube and arm. The intersecting passage defines and separates the longitudinal passage into two passage portions (hereinafter the "first" and "second" passage portions) on either side of the junction of the straight tube (1) and arm (2), and which contain nozzles (3) and (6), and between which is provided a mixing chamber generally designated (4). As also illustrated in the drawing FIGURE, the first passage portion, at a position adjacent the junction, is beveled inwardly towards the junction for providing a valve seat.

An injection nozzle (6), for the product to be treated extends longitudinally and is disposed axially in the first passage portion of the straight tube. The downstream end of this nozzle (6) converges downstream and thereby provides a beveled end valve member portion which increases in cross-section from the nozzle end and as illustrated, the beveled end valve member has a conically-shaped surface (7). The nozzle surface widens upstream of the conically-shaped surface.

A steam injection nozzle (3) is axially disposed in the second passage portion of the straight tube, which opens at the junction between the tubular arm and the straight tube. The inner wall of the downstream end of this nozzle (3) diverges downstream from a short bore (5) of constant cross-section and thus, has an outwardly beveled portion for providing a valve seat for the first nozzle beveled end valve member portion upon displacement and positioning of the valve member portion and the second valve seat against one another. The short bore is a bore of which the length is of the same order of magnitude as the square root of its cross-section. The length of the bore may be varied INTER ALIA according to the size of the junction which defines the mixing chamber and the throughput of steam.

The inner wall of the downstream end of the steam injection nozzle (3), as illustrated, thus has a conically shaped surface which widens downstream from the outlet orifice of the short bore (5) of constant cross-section.

At the downstream end of the product injection nozzle (6), the inner wall of the first tube portion of the straight tube comprises, as illustrated, a conically shaped constriction which converges towards the downstream end of the nozzle, i.e. which widens upstream of the nozzle. The downstream end of the product injection nozzle advances inside the downstream divergent end of the steam injection nozzle and in the conically shaped constriction of the inner wall of the straight tube. The downstream end of the steam injection nozzle advances towards the downstream end of the product injection nozzle so that these two ends define a passage frustoconical in shape which diverges towards the junction mixing chamber (4).

At least one orifice (8) is formed transversely in part of the downstream end of the product injection nozzle and opens into the first passage portion of the straight tube. The orifice may open into the zone comprising the conical constriction or just into the zone situated upstream.

The product and steam injection nozzles are mounted for displacement inside the first and second passage portions, respectively, of the straight tube along its longitudinal axis of symmetry. The axial displacement may take place by rotation about said axis of symmetry and may be effected, for example, by screwthreads formed on the inner wall of the straight tube and on the outer walls of the injection nozzles. Accordingly, the displacement enables two end positions to be defined for the arrangement, namely a so-called closed position, in which nothing enters the mixing chamber, and a so-called open position. It is in fact possible to define a series of open positions in which variable quantities of product to be treated and steam are able to enter the arrangement, these quantities being determined by said positions.

In the closed position, the product injection nozzle is disposed in such a way that the conically-shaped surface of its downstream end is in contact in the most fluid-tight manner possible with the conically-shaped constriction of the inner wall of the straight tube. In this position, the steam injection nozzle is disposed in such a way that the conically-shaped surface of its downstream end is in contact in the most fluid-tight manner possible with the conically-shaped surface of the downstream end of the product injection nozzle.

In the open position, the various possible intervals between the conically-shaped surface of the downstream end of the product injection nozzle and the conically-shaped constriction of the inner wall of the straight tube define the quantity of product which is able to flow into the mixing chamber. Similarly, in the open position, the various possible intervals between the conically-shaped surfaces of the downstream end of the steam injection nozzle and the downstream end of the product injection nozzle define the quantity of steam which is able to flow into the mixing chamber.

In one preferred embodiment of the arrangement, its various constituent elements are made of stainless steel.

In another preferred embodiment, the T-shaped body is provided at either end of the straight tube and at the end of the tubular arm with means for fixing to tubes having corresponding respective diameters. These means may be in the form of screwthreads or closure elements of the bayonet type. The various elements may be fixed in the T-shaped body in various ways, according to their respective shapes and types. The injection nozzles may be retained by a shoulder provided around the periphery of their upstream end and resting on a groove formed in the inner wall of the end of the tube.

To use the arrangement according to the invention, one end of the straight tube may be connected to a feed pipe for steam under pressure, the other end may be connected to a feed pipe for the fluid product to be treated, and the tubular arm may be connected to a dwell pipe. The dwell pipe itself may be connected by a back-pressure valve to a cooling or expansion chamber.

The present invention also relates to a process for treating a fluid product by injection of steam which may be carried out in the arrangement described above.

In the process according to the invention, the product to be treated, on the one hand, and the steam at sonic velocity, on the other hand, are each introduced in countercurrent to the other, for example from opposite ends of a straight tube, after which the steam and the product are mixed inside a mixing chamber and, finally, the treated product is removed through a tubular arm, the tubular arm and the straight tube forming a T-shaped tubular body.

EXAMPLES

The following Examples illustrate some uses of the arrangement according to the invention.

Example 1

A mixture of 1 kg wheat flour, 11 kg partly skimmed fresh milk, 500 g sucrose, 500 g sunflower oil and 500 g defatted cocoa is prepared. This mixture, which has a viscosity of the order of 1 mPa's and a temperature of approximately 20° C., is introduced into the arrangement according to the invention at one end of the straight tube, the entry pressure being adjusted to between 4 and 10 bar by means of the threaded setscrew for admission of the product which is provided for this purpose. Steam at 6 bar pressure is introduced at sonic velocity at the opposite end of the straight tube. The temperature is adjusted to 130° C. by means of the threaded setscrew provided for this purpose on the steam entry side. The contact of the product to be treated and the steam arriving in opposite directions ensures perfect homogenization of the mixture and instant temperature stabilization. The mixture is left for a certain time at a pressure of 2.5 bar to obtain a perfectly sterilized and stable end product.

Example 2

A milk pasteurized and concentrated 2.4 times with a viscosity of 500 mPa's and a temperature of 10° C. is introduced at the product entry end of the arrangement according to the invention, an entry pressure of 7 to 12 bar being maintained. Steam under a pressure of 12 bar is introduced at sonic velocity at the opposite steam inlet end. The temperature is adjusted to 150° C. by the threaded setscrew on the steam entry side. After 2 seconds at 150° C. under a pressure of 5 bar, the product is cooled to 70° C. by expansion under reduced pressure. The greater the temperature difference between the cold product and the sterilized product, the better the homogenizing effect. A sterilized concentrated milk is thus obtained.

Example 3

A mixture containing 1 kg rye flour, 1 kg barley flour, 1 kg corn flour, 1 kg rice flour, 1 kg oat flour, 7 kg whole wheat flour, 5 kg premalted wheat flour, 3 kg sugar and 30 kg water is prepared at 20° C. The mixture is introduced into the arrangement according to the invention at the product entry end in the same way as in Example 1. The steam is introduced at sonic velocity at the opposite end under a pressure of 10 bar. The temperature is adjusted to 135° C. by means of the setscrew on the steam side. The mixture thus gelatinized has a viscosity of the order of 80,000 mPa's. The mixture is kept at 135° C. for about 15 seconds and is then cooled to 95° C. by atmospheric expansion and dried on rollers before being ground. A sterilized and perfectly homogeneous product based on precooked cereals is thus obtained and may be reconstituted for instant consumption.

We claim:

1. An apparatus for treating fluid products comprising:

a tubular body having a longitudinal passage and an intersecting passage which intersects the longitudinal passage at a tubular body junction which defines and separates the longitudinal passage into first and second passage portions, the first passage portion, at a position adjacent the junction, being beveled inwardly in a direction towards the junction for providing a first valve seat;

a first nozzle member which extends longitudinally within the first passage portion and is mounted for reciprocative longitudinal displacement in the first passage portion, the first nozzle member comprising (i) a beveled end valve member portion which increases in cross-section from a nozzle end for, upon longitudinal displacement of the first nozzle member towards the junction, fluid-tight contact against the first valve seat; and (ii) a bore through the first nozzle member which opens into the first passage portion for providing fluid communication in the first passage portion from the bore to between the valve member portion and the first valve seat when the valve member portion is displaced from the first valve seat and so that the fluid communication is sealed off when the valve member is in fluid-tight contact with the first valve seat; and a second nozzle member which extends longitudinally within the second passage portion and is mounted for reciprocative longitudinal displacement in the second passage portion and which has a longitudinal bore which terminates in an outwardly beveled portion for providing a second valve seat for, upon displacement and positioning the first nozzle valve member portion and the second valve seat against one another, fluid-tight contact between the valve member portion and second valve seat.

2. An apparatus according to claim 1 wherein the first nozzle valve member portion is configured so that upon displacement away from the first valve seat for providing fluid communication, it projects from the first passage portion beyond the junction towards the second valve seat.

3. An apparatus according to claim 1 wherein the first valve seat encompasses a passage portion having a shape of a frustum and the first nozzle valve member portion has a shape of a cone.

4. An apparatus according to claim 2 wherein the first valve seat encompasses a passage portion having a shape of a frustum and the first nozzle valve member portion has a shape of a cone.

5. An apparatus according to claim 1 wherein the first valve seat encompasses a passage portion having a shape of a frustum, the first nozzle valve member portion has a shape of a cone and the bore portion encompassed by the second valve seat has a shape of a frustum.

6. An apparatus according to claim 2 wherein the first valve seat encompasses a passage portion having a shape of a frustum, the first nozzle valve member portion has a shape of a cone and the bore portion encompassed by the second valve seat has a shape of a frustum.

7. An apparatus according to claim 1 wherein screw threads mount the first and second nozzle members for, upon rotation of the nozzles, displacing the nozzles.

* * * * *